UNITED STATES PATENT OFFICE.

CARLETON ELLIS, OF MONTCLAIR, AND ALFRED A. WELLS, OF CALDWELL, NEW JERSEY, ASSIGNORS TO ELLIS-FOSTER COMPANY, A CORPORATION OF NEW JERSEY.

NITRATION METHOD.

1,309,320.  Specification of Letters Patent.  Patented July 8, 1919.

No Drawing.  Application filed March 19, 1917. Serial No. 155,741.

*To all whom it may concern:*

Be it known that we, CARLETON ELLIS and ALFRED A. WELLS, citizens of the United States, and residents, respectively, of Montclair, in the county of Essex and State of New Jersey, and Caldwell, in the county of Essex and State of New Jersey, have invented certain new and useful Improvements in Nitration Methods, of which the following is a specification.

This invention relates to the preparation of nitro aromatic bodies such as the nitro derivatives of phenol, cresol and the like and also to certain nitro derivatives of benzol or chlorbenzol, such for example as dinitrochlorbenzol and is concerned especially with the nitration of bodies which already possess one or more acid groups or acidic radicals in the benzol ring.

The invention relates particularly to the use of nitrating compositions comprising sulfuric acid and sodium nitrate yielding a nascent nitric acid and in many cases containing as result of the reaction various bodies such as sodium acid sulphate or other strongly acid salts which tend to reduce the amount of organic nitrated material that would otherwise dissolve in the acid reaction mixture, thereby enabling a saving in some cases of valuable raw material and a reduction in manufacturing cost.

The use of a mixture of sodium nitrate and sulfuric acid is known and has been recommended for the manufacture of mono-nitrochlorbenzol or of oil of myrbane. One of the difficulties with this nitration mixture is that it is ordinarily difficult to control and although regarded as a weak nitrating agent yet high temperatures are sometimes reached with violent or explosive reactions, or in other cases resins and tars are formed, so that heretofore reaction mixtures of this character have not been regarded as feasible although offering the advantage of nitric acid in a solid form, as it were, enabling shipment advantageously to the place of consumption. The apparently uncontrollable and indeterminate character of the reaction evidently has deterred its investigation in connection with the nitration of bodies already containing an acidic radical, for example the conversion of nitrobenzol into dinitrobenzol or of phenol into picric acid, cresol into dinitrocresol, naphthol into di or trinitronaphthol, toluol into trinitrotoluol and the like. The present invention has as one of its objects the production of these and analogous compounds by the use of sodium or equivalent nitrate and sulfuric acid to produce products of a high grade of commercial purity. 66° sulfuric acid and relatively weak acid mixtures may be used advantageously in many cases.

While the invention contemplates the treatment of compounds containing one or more acidic radicals in the benzol ring, as for example, chlorbenzol, or nitrochlorbenzol, it is possible to carry out the reaction in one stage so that mononitro compounds may be first formed in the reaction mass and other nitro compounds formed as secondary or tertiary steps so that while technically the operation may take place in one stage of operation, yet chemically speaking, the reaction would progress from stage to stage.

The invention will first be described with reference to the nitration of phenol, when for example, phenol is mixed with an equal part of sulfuric acid and the mass treated with a saturated aqueous solution of sodium nitrate, resinification usually takes place and a tarry or gummy compound of dark brown color is formed with rapidity, often with violent reaction. If however, the phenol-sulfuric acid material after warming is treated with a solution of sodium nitrate diluted sufficiently so that the reaction does not take place violently, too great an amount of water may be added although dinitrophenol or picric acid is formed, yet at the latter part of the reaction the dilution by water is so great that complete nitration is difficult. However, if the sodium nitrate solution is made up of sufficiently dilute character but containing say only about 25% of the sodium nitrate required and this is gradually added to the phenol sulfuric acid mixture which may also be diluted as required, nitration takes place and as soon as the nitric acid has dissolved in the solution, solid sodium nitrate may be added gradually or a very strong solution of the nitrate introduced, thereby preserving practically the same aqueous strength but increasing the amount of sodium nitrate to supply a sufficient quantity of nitric acid to complete the reaction.

Cresol behaves similarly to phenol in the manner in which it resinifies or forms tarry bodies on treatment with nitric acid or a mixture of nitric acid and sulfuric acid and it may be nitrated with sodium nitrate and sulfuric acid in a similar manner. In like manner naphthol and other hydroxy aromatic compounds of analogous or homologous character may be nitrated, varying the strength of the solution to secure the proper reacting condition.

Such variation in strength may take place in several ways: 1. By varying the amount of water in the sulfuric acid phenol material. 2. By varying the amount of water in the sodium nitrate solution. 3. By introducing dry sodium nitrate or very concentrated solutions thereof toward the end of the reaction or after the reaction has progressed to such a point that an aqueous concentration of the right degree has been obtained. 4. The aqueous solution of sodium nitrate before addition to the organic body, may contain sulfuric acid adjusted to good reacting conditions.

The picric acid obtained by the foregoing operation may be recrystallized from water and centrifuged to produce a product of higher purity.

In like manner trinitrotoluol may be produced in one stage from toluol employing concentrated sulfuric acid adding strong or fuming acid to the reaction mixture after nitration has progressed for a time, it being desirable to in some cases admix a portion of the sodium nitrate required in the first instance and make gradual additions as required.

Another feature of the invention involves the decomposition of the nitrating mixture by digesting the sodium nitrate and sulfuric acid for a time when reaction takes place. Because of the sodium chlorid present in the Chile saltpeter, chlorin and hydrogen chlorid are evolved by such digestion and chlorin is eliminated which otherwise would in some cases unite with the benzol ring forming products which would be objectionable for certain purposes. Hence, preferably, the present process also contemplates the pretreatment of the nitration mixture to remove such chlorinating agents.

Thus in the nitration of benzol, chlorbenzol, toluol and the like, a quantity of the nitration mixture may be prepared sufficient to partially nitrate. This may be allowed to stand until chlorin has been eliminated to a sufficient degree when the benzol, chlorbenzol, toluol or other raw material to be nitrated is added with cooling and nitration allowed to progress with careful regulation of the temperature. Meanwhile, a second quantity of the nitration mixture is being prepared and this is gradually added with the same precautions in regard to cooling, the temperature ordinarily being kept below 100° C. The dechlorinated reaction mixture may be added in portions in this manner until a sufficient amount of nitrating mixture is present. Very little more than the theoretical amount of nitrate is required in most cases perhaps owing to the form in which the nitric acid appears to be found in the solution whether in a nascent state or in some condition which appears to be conducive to effective nitration.

After initial nitration has been carried out at a relatively low temperature the reaction mixture may be heated to form the next stage and so on, and finally 98% of fuming sulfuric acid may be added if a very strong nitrating effect is required. The temperature may be gradually raised to 130–140 or 150° C., or even higher in the case of trinitro compounds such as trinitrotoluol and the like. A temperature as high as 170° C can be used in the final stages.

In like manner it may be possible to introduce four or more nitro groups into the benzol ring or body in hand.

Owing to the presence of the saline matter the nitro compound formed does not, as indicated, dissolve readily in the nitration mixture but is comparatively insoluble so that in the case of, for example, dinitrochlorbenzol, practically none of this material dissolves in the sulfuric acid sodium acid sulfate solution, while when using mixed acids in the ordinary manner there may be expected to be a considerable loss in this way in many cases.

The invention will be further illustrated in certain details in connection with the preparation of dinitrochlorbenzol and derivatives to form namely, dinitrophenol which may subsequently if desired be nitrated to picric acid by treatment with a reaction mixture of sodium nitrate and sulfuric acid.

8580 lbs. of sulfuric acid 66° Bé. are placed in nitrating kettle and 2860 lbs. commercial sodium nitrate slowly added. The mixture is then agitated in the cold until chlorin can no longer be detected coming from the kettle. 1430 lbs. of chlorbenzol are now run in slowly while cold water is run through jacket. When chlorbenzol is first added the temperature rises very rapidly. Care must be taken that the temperature does not rise above 70° C. After about one-third of the chlorbenzol has been added the remainder may be added more rapidly. During this addition of chlorbenzol the temperature should not rise above 70° or go below 55° C. The temperature is now gradually raised to 90° C. and maintained between 90–100° C. for 6 hours. The temperature is gradually raised to 125° C., ten hours being required to raise temperature to this point. Temperature is maintained for five hours between 125–130° C. and on sampling the nitration should then be found practically complete to the dinitro stage. If not, continue the heating as required.

The charge is now run off, the spent acid being separated. The dinitrochlorbenzol is passed into the hydrolyzer, which contains 13,000 lbs. of 10% solution of caustic soda, while agitator is running. Solution is then boiled for one-half to one hour until upon taking sample of solution no dinitrochlorbenzol will settle out. The free caustic soda is then neutralized by the addition of a dilute solution of sulfuric acid. Recommend that care be taken that the solution is exactly neutral. The solution is now steam distilled until no more oily bodies are given off. This procedure may be omitted when the amount of oils obtained is negligible.

Before steam distillation the liquor is allowed to stand for one-half hour, care being taken that temperature of solution does not go below 90° C. and any traces of tarry material are drawn off from bottom of hydrolyzer. The sodium dinitrophenate solution is then filtered and run with agitation into a dilute solution of sulfuric acid, enough acid being used to break up the sodium dinitrophenate. The solution is then filtered through rapid filtering medium such as cotton cloth and the dinitrophenol washed free of acid and dried.

By a modified form of procedure 10 parts by weight of phenol and a like amount of sulphuric acid of 98% strength were warmed on a water bath and 10 parts of water added. 30 parts of sodium nitrate were mixed with 20 parts of sulfuric acid of 98% strength, all lumps of the nitrate being broken up. 10 parts of water were then added to this nitration mixture. The phenol sulfonate was slowly added to the nitration mixture while cooling and the reaction was allowed to proceed for about one-half hour and at 20–30° C. and was then raised to 60–70° C. for about two hours. The temperature was then raised to 80–90° C. for another hour and finally heated to about 120° C. for one hour. A good yield of a mixture of dinitrophenol and picric acid was obtained with only traces of tarry bodies, which however, were of such a character that they settled readily to the bottom on pouring the batch into water.

In another case 10 parts by weight of phenol and a like amount of sulfuric acid of 98% strength was warmed on a water bath and 5 parts of water then added. In using 98% strength sulfuric acid it should be understood that inasmuch as dilution is required in any case the acid need not be necessarily of this strength particularly in the nitration step. When acid of other strength is employed the dilution may be made corresponding for example to the actual content of water herein illustratively set forth. A mixture of 35 parts of sodium nitrate, 30 parts of sulfuric acid and 10 parts of water was prepared and was found to be of a pasty consistency. To this, the phenol sulfuric acid material previously prepared was added with stirring and cooling and as soon as incorporation was complete, the temperature was raised to about 35° C. for a half hour, then to about 70° C., for three-quarters of an hour, and finally brought up to 125° C. all in a period of about two hours. At the end of this time a well nitrated product was secured.

It is important in the foregoing process when nitrating, for example, phenol, to produce dinitrophenol, or picric acid, to adjust the strength of the solution by adding more or less water to the nitration mixture and also preferably to the sulfonated mixture, or in any event, to have enough water present with the reacting components so that the reaction will be moderated to an extent permitting nitration to progress smoothly with practically little or no formation of tarry or resinous bodies and the addition of the water may be proportioned by preliminary treatment on the small scale to determine the best results with the reacting constituents.

A feature of the present invention is the addition of the sulfonated phenolic body or phenolic constituent to the nitration mixture gradually with stirring and cooling instead of the customary way of adding the nitrating agent to the phenolic body or sulfonated product. A control of the progress of the reaction is better secured by this procedure than by adding the acid to the phenol sulfonate.

The sodium sulfate or acid sulfate formed by the action of sulfuric acid on sodium or potassium nitrate is of value as an anti-resinifying agent. Because of its presence there is practically no formation of resins during the nitration of phenol.

What we claim is:—

1. The process of making picric acid which comprises sulfonating phenol and nitrating it with a nitration mixture comprising sodium nitrate, sulfuric acid and water and the products of reaction of the sulfuric acid on sodium nitrate.

2. The process of making picric acid which comprises sulfonating phenol and nitrating it with a nitration mixture comprising a nitrate, sulfuric acid and water.

3. The process of making picric acid which comprises sulfonating phenol and nitrating it with a nitration mixture comprising sodium nitrate, sulfuric acid and water whereby resinification is retarded.

4. The process of making picric acid which comprises sulfonating phenol and nitrating it with a nitration mixture comprising sodium nitrate, sulfuric acid and water, acid sodium sulfate and nascent nitric acid.

5. The process of making higher nitration products of phenolic bodies which comprises treating a phenol with sulfuric acid and in incorporating the product with a nitrating mixture prepared by mixing sodium nitrate, sulfuric acid and water.

6. The process of making higher nitration products of phenol which comprises sulfonating carbolic acid with sulfuric acid and in incorporating the product with a nitrating mixture prepared by mixing sodium nitrate, sulfuric acid and water.

7. The process of making higher nitration products of phenolic bodies which comprises sulfonating a phenol and in incorporating the sulfonated mixture with a nitrating mixture prepared by mixing an alkali metal nitrate, sulfuric acid and water and containing an alkali metal sulfate as a retardant of resin formation.

8. In the process of making higher nitration products of phenol the step which comprises adding sulfonated phenol slowly with agitation to a nitration mixture comprising sulfuric acid, sodium nitrate and water, the amount of the latter being adjusted to prevent the substantial formation of tarry bodies.

9. In the process of making higher nitration products of phenol the step which comprises adding sulfonated phenol slowly with agitation to a nitration mixture comprising sulfuric acid, sodium nitrate, sodium acid sulfate and water, the amount of the latter being adjusted to prevent the substantial formation of tarry bodies.

10. The process of making picric acid which comprises reacting on phenol with a nitration mixture comprising an acid solution of sodium nitrate in the presence of water in an amount sufficient to substantially prevent resinification.

11. The process of making higher nitration products of phenol which comprises sulfonating carbolic acid with sulfuric acid and in incorporating the product with a nitrating mixture prepared by mixing sodium nitrate sulfuric acid and water whereby trinitrophenol is formed.

CARLETON ELLIS.
ALFRED A. WELLS.